United States Patent
Spotwood (10) Patent No.: US 7,665,080 B2
(45) Date of Patent: Feb. 16, 2010

(54) SYSTEM AND METHOD FOR USING A CLASSLOADER HIERARCHY TO LOAD SOFTWARE APPLICATIONS

(75) Inventor: Mark Spotwood, Newton Center, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 492 days.

(21) Appl. No.: 10/777,361

(22) Filed: Feb. 12, 2004

(65) Prior Publication Data

US 2004/0255293 A1 Dec. 16, 2004

Related U.S. Application Data

(60) Provisional application No. 60/446,836, filed on Feb. 12, 2003.

(51) Int. Cl.
*G06F 9/44* (2006.01)
*G06F 15/177* (2006.01)

(52) U.S. Cl. .......................... 717/166; 713/2
(58) Field of Classification Search ........................ None
See application file for complete search history.

(56) References Cited

U.S. PATENT DOCUMENTS

| | | | |
|---|---|---|---|
| 6,470,494 B1 | 10/2002 | Chan et al. | 717/166 |
| 6,915,511 B2 * | 7/2005 | Susarla et al. | 717/166 |
| 7,039,923 B2 * | 5/2006 | Kumar et al. | 719/331 |
| 2002/0147971 A1 | 10/2002 | Adams | |
| 2003/0018950 A1 * | 1/2003 | Sparks et al. | 717/100 |
| 2003/0177484 A1 | 9/2003 | Bosschaert et al. | |
| 2004/0015936 A1 | 1/2004 | Susarla et al. | |
| 2004/0019887 A1 * | 1/2004 | Taylor et al. | 717/166 |
| 2004/0019897 A1 | 1/2004 | Taylor et al. | |
| 2004/0143826 A1 | 7/2004 | Gissel et al. | |

OTHER PUBLICATIONS

Liang and Bracha, "Dynamic Class Loading in the Java Virtual Machine", 1998, ACM, OOPSLA '98, pp. 36-44.

(Continued)

*Primary Examiner*—Tuan Q Dam
*Assistant Examiner*—Zheng Wei
(74) *Attorney, Agent, or Firm*—Fliesler Meyer LLP (57) ABSTRACT

A system and method for allowing individual software modules to be reloaded in memory without forcing other modules to be reloaded at the same time. Such reloadable modules address the problem of not being able to reload a module without reloading all classes in the application. In accordance with one embodiment the root classloader and webapp classloader are reorganized, and the individual modules placed in their own classloader. This allows the developer to define their classloader organization according to their needs. The system can then reload modules or classes without affecting the rest of the application.

22 Claims, 7 Drawing Sheets

OTHER PUBLICATIONS

Sing, Stearns, Johnson et al., "Designing Enterprise Applications with the J2EE Platform, Second Edition", Sun Microsystems, Archived Dec. 2002 online at <http://web.archive.org/web/20021227055218/http://java.sun.com/blueprints/guidelines/designing_enterprise_applications 2e/deployment/deployment5.html>.

"Writing Web Application Deployment Descriptors", BEA, archived on Jul. 24, 2001 at <http://web.archive.org/web/20010724132221/http://e-docs.bea.com/wls/docs61/webapp/webappdeployment.html>.

Grosso, W., "Java RMI", Oct. 2001, O'Reilly & Associates, ISBN 1-56592-452-5, Chapter 19.

Allamaraju, et al "Professional Java Server Programming", J2EE, 1.3 Edition, 186-00537-7 (Wrox Press), Sep. 2001, Chapter 24, pp. 1-24.

Peterson, "Understanding J2EE Application Server Class Loading Architectures", May 2002, [retrieved from web] http://www.theservrside.com/tt/articles/article.tss?!=ClassLoading, pp. 1-8.

Deboer, et al., "J2EE Class Loading Demystified", Aug. 21, 2002 [retrieved from IBM Website] http://www.ibm.com/developerworks/library/devin-xalan.html., pp. 1-10.

* cited by examiner

SYSTEM AND METHOD FOR USING A CLASSLOADER HIERARCHY TO LOAD SOFTWARE APPLICATIONS

CLAIM OF PRIORITY

This application claims priority from U.S. Provisional Patent Application No. 60/446,836, entitled "SYSTEM AND METHOD FOR USING CLASSLOADER HIERARCHY TO LOAD SOFTWARE MODULES", by Mark Spotswood, filed Feb. 12, 2003, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer software application execution, and particularly to a system and method for allowing individual software modules and classloaders to be reloaded in memory without forcing other modules to be reloaded at the same time.

CROSS-REFERENCES

This application is related to U.S. Provisional Patent Application No. 60/446,878, entitled "SYSTEM AND METHOD FOR HIERARCHICAL LOADING OF EJB IMPLEMENTATIONS"; by Mark Spotswood, filed Feb. 12, 2003; and to U.S. patent application Ser. No. 10/777,362 entitled "SYSTEM AND METHOD FOR HIERARCHICAL LOADING OF EJB IMPLEMENTATIONS", by Mark Spotswood, filed Feb. 12, 2004, both of which are incorporated herein by reference.

BACKGROUND

Many of today's computer software applications are written in the Java programming language. Java differs from other programming languages in that programs written in Java are generally run in a virtual machine environment. Once a Java program is written, it may then be compiled into byte-code, interpreted by the Java Virtual Machine (JVM) into hardware instructions, and executed on a variety of different platforms. This methodology allows Java to follow the "write once, run anywhere" paradigm. Components of Java programs are stored in modular components referred to as class files. A class may be defined as a collection of data and methods that operate on that data. A class is able to inherit properties (and methods) from any other class which is found above it in the hierarchy of inter-related classes for a particular program. The class located at the highest tier in the hierarchy is commonly referred to as the "parent class" or "superclass", while an inheriting class located on a lower tier is commonly referred to as the "child class" or "subclass".

Classloaders are a fundamental component of the Java language. A classloader is a part of the Java virtual machine (JVM) that loads classes into memory; and is the class responsible for finding and loading class files at run time. A successful Java programmer needs to understand classloaders and their behavior. Classloaders are arranged in a hierarchy with parent classloaders and child classloaders. The relationship between parent and child classloaders is analogous to the object relationship of super classes and subclasses.

The bootstrap classloader is the root of the Java classloader hierarchy. The Java virtual machine (JVM) creates the bootstrap classloader, which loads the Java development kit (JDK) internal classes and java.* packages included in the JVM. (For example, the bootstrap classloader loads java-.lang.String).

The extensions classloader is a child of the bootstrap classloader. The extensions classloader loads any Java Archive (JAR) files placed in the extensions directory of the JDK. This is a convenient means to extending the JDK without adding entries to the classpath. However, anything in the extensions directory must be self-contained and can only refer to classes in the extensions directory or JDK classes.

The system classpath classloader extends the JDK extensions classloader. The system classpath classloader loads the classes from the classpath of the JVM. Application-specific classloaders (including, in the case of the BEA WebLogic product, WebLogic Server classloaders) are children of the system classpath classloader.

As used herein the term "system classloader" is used to refer to a type of classloader which is frequently referred to as an "application classloader" in contexts outside of the BEA WebLogic Server product. When discussing classloaders in WebLogic Server, the term "system" is used to differentiate those classloaders from classloaders related to J2EE applications (which BEA WebLogic typically refers to as "application classloaders").

Classloaders typically use a delegation model when loading a class. The classloader implementation first checks to see if the requested class has already been loaded. This class verification improves performance in that the cached memory copy is used instead of repeated loading of a class from disk or permanent storage. If the class is not found in memory, the current classloader asks its parent for the class. Only if the parent cannot load the class does the classloader then attempt to load the class. If a class exists in both the parent and child classloaders, the parent version is loaded. This delegation model is followed to avoid multiple copies of the same form being loaded. Multiple copies of the same class can lead to a ClassCastException.

As mentioned above, classloaders ask their parent classloader to load a class before attempting to load the class themselves. In a product such as BEA WebLogic, classloaders that are associated with Web applications can also be configured to check locally first before asking their parent for the class. This allows Web applications to use their own versions of third-party classes, which might also be used as part of the WebLogic Server product.

At run-time, application classes are loaded into the JVM for execution by a hierarchy of one or more classloaders. This (sub)hierarchy is below the system classloader described above. The simplest design of this classloader hierarchy includes one root classloader which loads all the modules and individual class files which an application requires. However, this design is very inefficient, in that reloading a single class file or module requires the reloading of all class files or modules previously loaded by that classloader.

A second hierarchical configuration loads the majority of the class files required by the application into the root classloader and allows only web modules (commonly packaged as ".WAR" archives) to be loaded by classloaders one level subordinate to the root classloader. However, this implementation does not address the fact that the set of all modules (for example Enterprise Java Beans or EJBs) utilized by an application is still required to be loaded by a single classloader, and, therefore reloaded as a set. The problems of both of these typical hierarchical organizations include:

1. A module, for example an EJB, cannot be reloaded without reloading all classes in the application, which effectively means having to reinitialize (reinit) the entire application.

2. There is no namespace separation between modules (for example between EJB's).

A mechanism that provides more granular control over the classloader hierarchy structure and the associated interrelationships between classes would help address these problems, and give the developer better control over the reloading and namespace separation of individual modules, including EJB's.

SUMMARY OF THE INVENTION

The present invention provides a system and method for allowing individual software modules to be reloaded in memory without forcing other modules to be reloaded at the same time. Such "reloadable modules" address the problem of not being able to reload a module or component without reloading all classes in the application. In accordance with one embodiment the root classloader and webapp classloader levels are reorganized, and the individual implementation classes placed in their own classloader. This allows the developer to define their classloader organization according to their particular needs. In this way the system can reload a component or class without affecting the rest of the application. The developer has the ability to organize the top two levels (i.e. the root and webapp levels) on a per-module basis as they see fit. The third level is organized automatically. In accordance with one embodiment, a developer can declare the classloader hierarchy in an application deployment descriptor (for example a weblogic-application.xml file) as follows:

<!ELEMENT classloader-structure (module-ref*, classloader-structure*)>
<!ELEMENT module-ref (module-uri)>
<!ELEMENT module-uri (#PCDATA)>

DETAILED DESCRIPTION

The Java 2 Platform, Enterprise Edition (J2EE) defines a standard for developing component-based enterprise applications. Enterprise JavaBeans (EJBs) are the server-side components for J2EE. EJBs allow for development of distributed, portable applications based on Java. JavaServer Page (JSP) components allow for creating web pages that display dynamically-generated content. JSP pages are compiled into servlets and may call EJBs. Additional information about J2EE, EJBs and JSPs can be found in the J2EE specifications published by Sun Microsystems, Inc., each of which are incorporated herein by reference.

The present invention provides a system and method for allowing individual software modules or components, such as J2EE modules, to be reloaded in memory without forcing other modules to be reloaded at the same time. Such "reloadable modules" address the problem of not being able to reload, for example, an EJB without reloading all classes in the application. In accordance with one embodiment the root classloader and webapp classloader levels are reorganized, and the individual module (e.g. EJB implementation classes) placed in their own classloader. In this way the system can reload the Enterprise Java Bean (EJB) implementation (impl) class without affecting the rest of the application. The system or a developer can also reload an individual EJB module without affecting the rest of the application. The developer has the ability to organize the root and webapp levels on a per-module basis, as they see fit. The third level is organized automatically.

One embodiment of the present invention provides the capability for customization of the classloader hierarchy for use with an application server, such as the WebLogic server product or another type of application server. A deployment descriptor or control file can include a "classloader-structure" stanza which is then interpreted by an application component, such as an application container constructor, either singularly or as recursive nested references to modules and/or individual class files. A hierarchy (a "tree") of associated classloaders is then built. As the application container is constructed, the application server traverses the tree specified in the control file and builds a parent-child relationship between the tiers of selected classloaders, thus establishing the hierarchy.

In another embodiment, a single web module, an EJB module, an EJB implementation class, or a combination of these elements may be placed in a plurality of subordinate classloaders. Subsequently, one may reload an update to any of these objects without reloading other application modules, thus preserving time, effort, and application stability.

Figure 1:
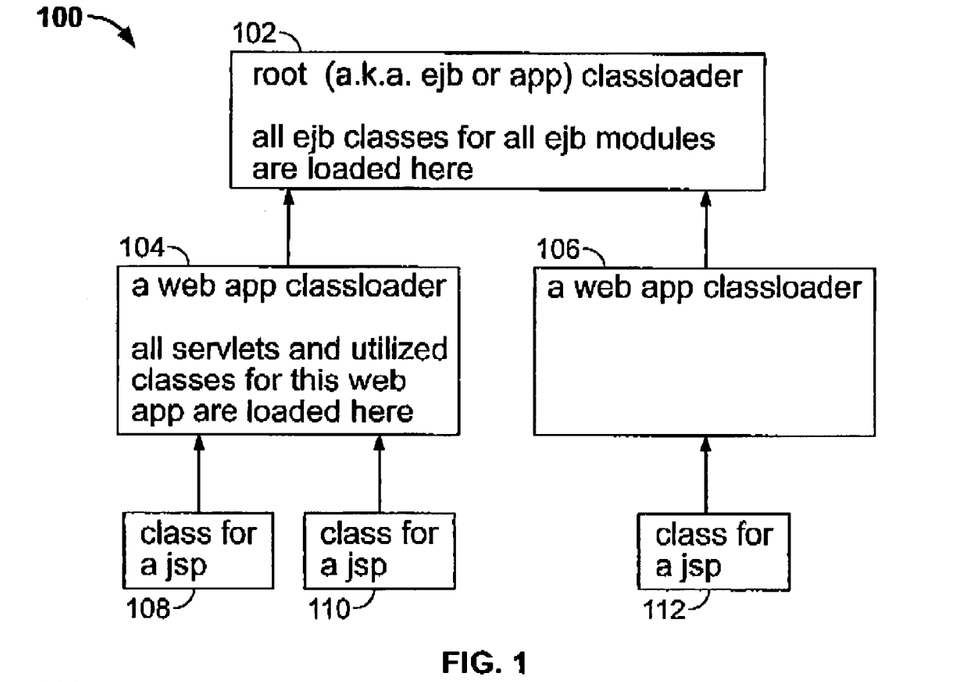
FIG. 1 illustrates a standard classloader structure commonly utilized by applications.

Typically, the standard classloader organization for an application includes a root classloader for all EJBs in the application. For each web application there is a separate classloader that is a child of the application root classloader (sometimes referred to as the EJB classloader). Also, each Java Server Page (JSP) has its own classloader which is a child of its web application's classloader. The standard classloader organization 100 for an application appears as shown in FIG. 1, and includes a root classloader 102, a set of Web app classloaders 104, 106, and classes 108, 110, 112 for the respective Web apps. This is an optimal organization for most users because:

1. A developer (or the system) can reload JSPs individually.
2. Webapps can be reloaded individually.
3. Webapp code can directly reference classes in EJB modules. This allows us to pass EJB parameters by reference rather than by value.

4. A Developer (or the system) can perform namespace separation between web applications.

5. Modules that reference EJBs in other modules aren't required to include the interfaces for those EJBs since they are visible in the root classloader.

However, the downside of the standard organization includes that:

1. The developer cannot reload an EJB without reloading all classes in the application (which effectively means reinitializing the entire app 2. The system doesn't allow namespace separation between EJB modules.

Reloadable modules address the problem of being able to reload a module or EJB without reloading all classes in the application, at the expense of being able to directly reference classes in EJB modules.

In accordance with one embodiment of the invention, the root classloader and webapp classloader levels (the top two classloader levels shown in FIG. 1) are reorganized at the module level, and the individual EJB implementation classes are put in their own classloader.

Figure 2:
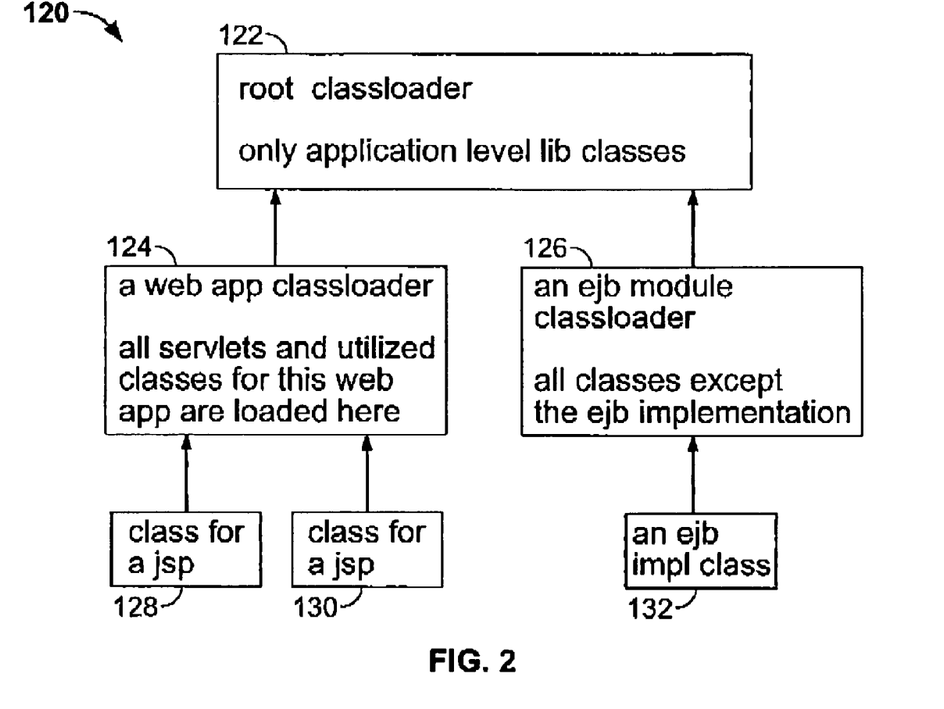
FIG. 2 illustrates a classloader structure in accordance with one embodiment of the invention.

FIG. 2 illustrates the resulting classloader architecture 120, in which the root classloader 122 contains only application level library classes. A Web app classloader 124 contains all servlet and utility classes for this Web app, while an EJB module classloader 126 contains all classes except the EJB implementation. A third level contains the classes for the JSP's 128, 130, 132. With this architecture, a developer can reload the EJB impl class without affecting the rest of the application. They can also reload an individual EJB module without affecting the rest of the application. These features provides the developer with the ability to organize the first two levels on a per-module basis according to their needs. The third level is done automatically.

Application Classloading

In a typical application server environment, for example a WebLogic Server implementation, classloading is centered on the concept of an application. An application is normally packaged in an Enterprise Archive (EAR) file containing application classes. Everything within an EAR file is considered part of the same application. The following may be part of an EAR or can be loaded as standalone applications:

An Enterprise JavaBean (EJB) JAR file;

A Web Application WAR file; and/or,

Resource Adapter RAR file.

If a developer deploys an EJB JAR file and a Web Application WAR file separately, they are considered two applications. If they are deployed together within an EAR file, they are considered a single (i.e. one) application. The developer can deploy components together in an EAR file for them to be considered part of the same application. If the developer needs to use resource adapter-specific classes with Web components (for example, an EJB or Web application), they must bundle these classes in the corresponding component's archive file (for example, the JAR file for EJBs or the WAR file for Web applications).

Every application receives its own classloader hierarchy. The parent of this hierarchy is the system classpath classloader. This isolates applications so that application A cannot see the classloaders or classes of application B. In classloaders, no sibling or friend concepts exist. Application code only has visibility to classes loaded by the classloader associated with the application (or component), and classes that are loaded by classloaders that are ancestors of the application (or component) classloader. This allows a server such as the WebLogic Server to host multiple isolated applications within the same JVM.

Application Classloader Hierarchy

WebLogic Server automatically creates a hierarchy of classloaders when an application is deployed. The root classloader in this hierarchy loads any EJB JAR files in the application. A child classloader is created for each Web Application WAR file. Because it is common for Web Applications to call EJBs, the application classloader architecture allows JavaServer Page (JSP) files and servlets to see the EJB interfaces in their parent classloader. This architecture also allows Web Applications to be redeployed without redeploying the EJB tier. In practice, it is more common to change JSP files and servlets than to change the EJB tier.

Figure 3:
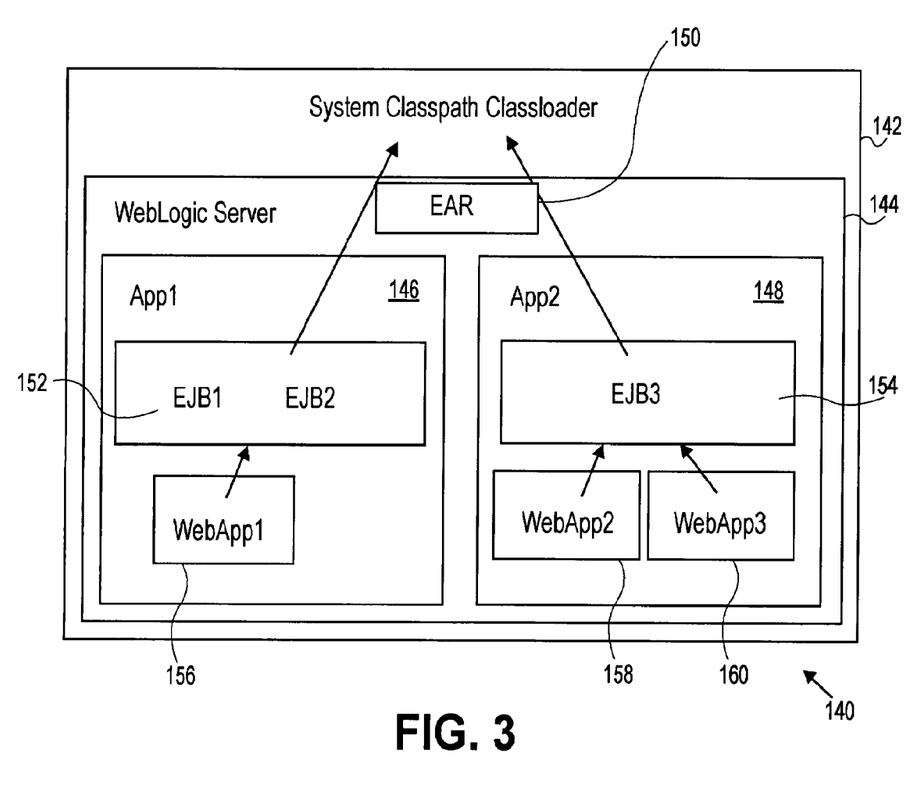
FIG. 3 illustrates a classloader hierarchy example in accordance with an embodiment of the invention.

FIG. 3 illustrates this WebLogic Server application classloading concept. If the application includes servlets and JSPs that use EJBs, the developer should:

Package the servlets and JSPs in a WAR file.

Package the enterprise beans in an EJB JAR file.

Package the WAR and JAR files in an EAR file.

Deploy the EAR file.

Although the developer could deploy the WAR and JAR files separately, deploying them together in an EAR file 150 produces a classloader arrangement that allows the servlets and JSPs to find the EJB classes. If they deploy the WAR and JAR files separately, the server 144 (in this instance the WebLogic Server) creates sibling classloaders 146, 148 for them. This means that they must include the EJB home and remote interfaces in the WAR file, and the server must use the RMI stub and skeleton classes for EJB calls, just as it does when EJB clients and implementation classes are in different JVMs. The Web application classloader 152, 154 contains all classes for the Web application except for the JSP class. The JSP class 156, 158, 160 obtains its own classloader, which is a child of the Web application classloader. This allows JSPs to be individually reloaded.

Custom Module Classloader Hierarchies

In accordance with an embodiment of the invention, a developer can create custom classloader hierarchies for an application, which allows for better control over class visibility and reloadability. They achieve this by defining a classloader-structure element in the servers control file or deployment descriptor file (which for example in WebLogic is the weblogic-application.xml file).

Figure 4:
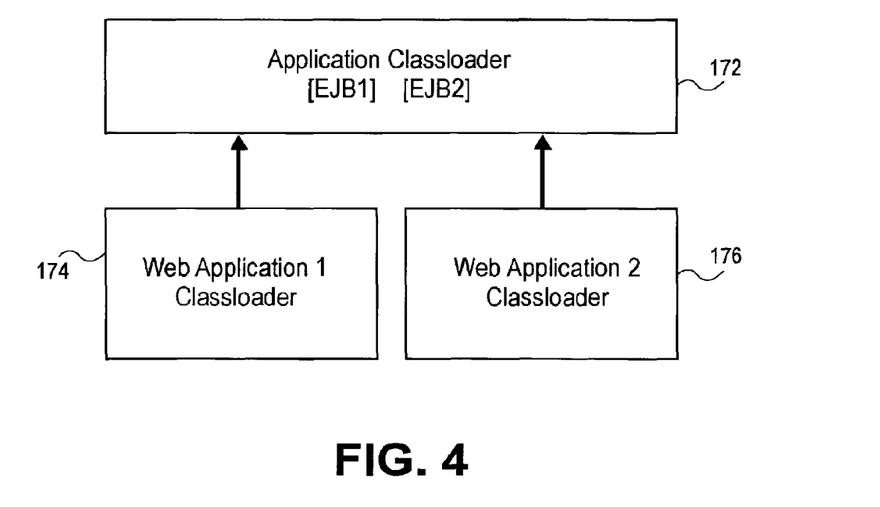
FIG. 4 illustrates a default classloader hierarchy in accordance with an embodiment of the invention.

FIG. 4 illustrates how classloaders are organized by default for applications in a WebLogic implementation. An application level classloader exists where all EJB classes are loaded. For each Web module 172, there is a separate child classloader 174, 176 for the classes of that module. (For simplicity, JSP classloaders are not shown in FIG. 4). This hierarchy is optimal for most applications, because it allows call-by-reference semantics when the developer invokes on EJBs. It also allows Web modules to be independently reloaded without affecting other modules. Further, it allows code running in one of the Web modules to load classes from any of the EJB modules. This is convenient, as it can prevent a Web module from including the interfaces for EJBs that it uses. The ability to create custom module classloaders provides a mechanism to declare alternate classloader organizations that allow the following:

Reloading of individual EJB modules independently.

Reloading of groups of modules to be reloaded together.

Reversing the parent child relationship between specific Web modules and EJB modules.

Namespace separation between EJB modules.

Declaring the Classloader Hierarchy

As mentioned above, in accordance with one embodiment, the developer can declare the classloader hierarchy in the application deployment descriptor file, for example in a WebLogic environment the weblogic-application.xml file. The document type definition (DTD) for this declaration is as follows:

```
<!ELEMENT classloader-structure (module-ref*, classloader-structure*)>
<!ELEMENT module-ref (module-uri)>
<!ELEMENT module-uri (#PCDATA)>
```

The top-level element in weblogic-application.xml includes an optional classloader-structure element. If the developer does not specify this element, then the standard classloader is used. Also, if the developer does not include a particular module in the definition, it is assigned a classloader, as in the standard hierarchy, i.e., EJB modules are associated with the application Root classloader and Web Modules have their own classloaders. The classloader-structure element allows for the nesting of classloader-structure stanzas, so that the developer can describe an arbitrary hierarchy of classloaders. The outermost entry indicates the application classloader. For any modules not listed, the standard hierarchy is assumed.

Note that JSP classloaders are not included in this definition scheme. JSPs are always loaded into a classloader that is a child of the classloader associated with the Web module to which it belongs. The following is an example of what a classloader declaration may look like. It will be evident that this example is given for purposes of illustration, and is not intended to limit the scope of the invention in anyway. Other examples may be evident to one skilled in the art:

```
<classloader-structure>
    <module-ref>
        <module-uri>ejb1.jar</module-uri>
    </module-ref>
    <module-ref>
        <module-uri>web3.war</module-uri>
    </module-ref>
    <classloader-structure>
        <module-ref>
            <module-uri>web1.war</module-uri>
        </module-ref>
    </classloader-structure>
    <classloader-structure>
        <module-ref>
            <module-uri>ejb3.jar</module-uri>
        </module-ref>
        <module-ref>
            <module-uri>web2.war</module-uri>
        </module-uri>
        <classloader>
            <module-ref>
                <module-uri>web3.war</module-uri>
            </module-ref>
        </classloader>
        <classloader>
            <module-ref>
                <module-uri>ejb2.jar</module-uri>
            </module-ref>
        </classloader>
    </classloader>
</classloader>
```

The organization of the nesting in the above classloader declaration indicates the classloader hierarchy. The above stanza can be used to produce a hierarchy such as that illustrated in FIG. 5. In the example shown above, the modules or individual class files, identified by "module-uri" tags, are then retrieved from a storage medium, usually attached to or part of the application server, but in some instance attached to or part of the client environment directly, and loaded into the JVM in the order and according to the relationship hierarchy specified. As the classes are loaded into the JVM, the application server may also compare the content of a module with the content of previously loaded modules prior to its introduction to the application container in order to prevent the introduction of duplicate modules. If the deployment descriptor or control file specifies that duplicate module or duplicate classes are to be loaded, the application server may perform an event-handling task such as returning a message to the output device or terminating the load altogether.

Figure 5:
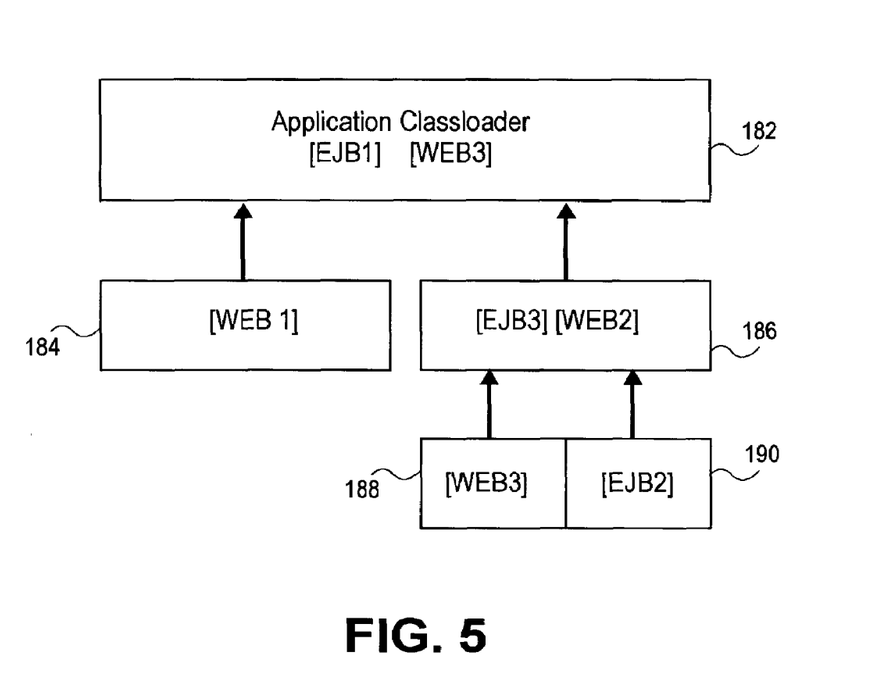
FIG. 5 illustrates a classloader hierarchy generated as a result of parsing a classloader structure in accordance with an embodiment of the invention.

FIG. 5 illustrates a search order that can be used for locating classes not found within the same classloader as the calling module in Java applications. The search proceeds up to a higher level of the tree, but is limited to only those classloaders which are a direct "ancestor" of the calling classloader. Thus, a class or module located in a "sibling" classloader to the classloader containing the calling class or module will not be located. For instance, an EJB module or implementation class 188, 190 might require the use of a method located in a web module in a higher tier 182. The classes and modules co-located in the calling classloader can be searched first. If the required method is not found, the search may proceed to the parent classloader 186 of the classloader which contains the calling class. Each component located in the parent classloader may be searched and, if the method is not found, the search continues further up the hierarchy to the next ancestor classloader 182. Upon locating the desired method within a class file, the calling module can proceed to create an instantiation of the necessary object(s) for execution. However, if a component 188, 190 required the use of a method located in a sibling classloader 184, the limitations of the traditional search method would require the use of Remote Method Invocation (RMI) in order to execute the desired method. One embodiment of the present invention addresses this problem by granting the capability to place classes or modules frequently called by one another on the same branch (or in the same classloader), and therefore, in the same search path, while at the same time allowing the components to be optionally separated into different classloaders to facilitate dynamic reloading.

Figure 6:
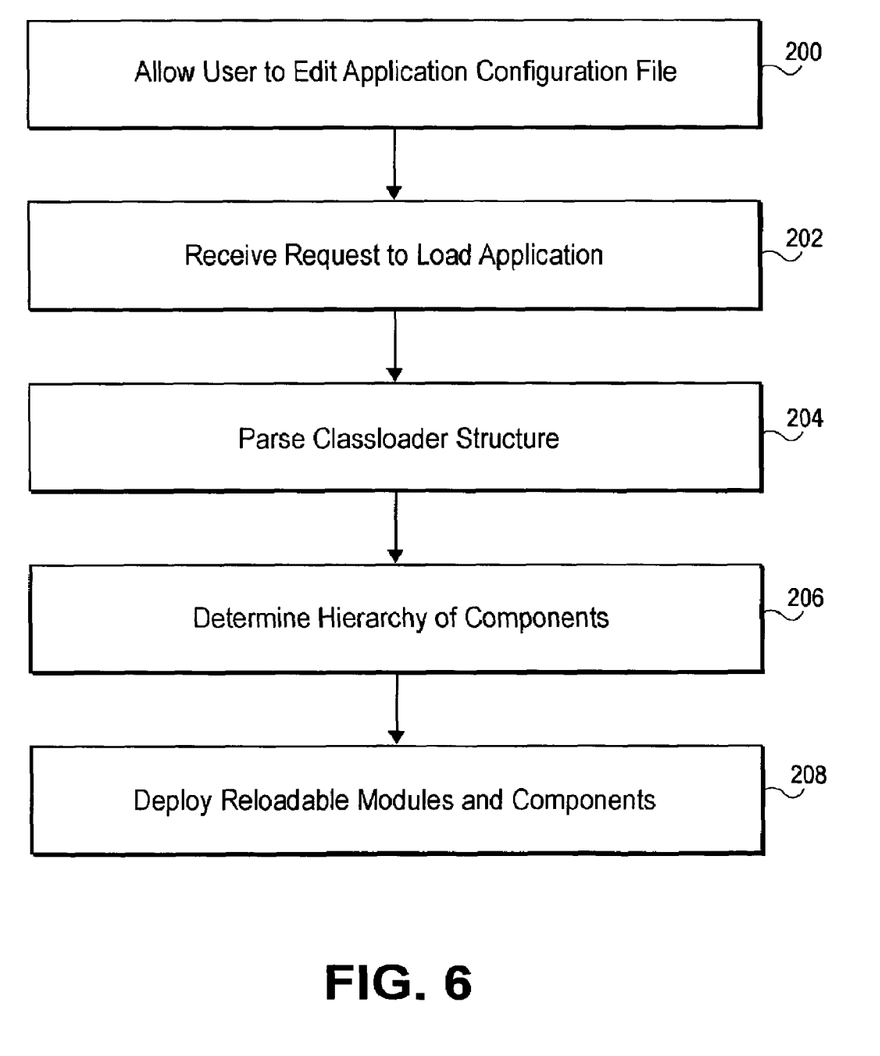
FIG. 6 is a flowchart showing the steps used to parse a classloader hierarchy in accordance with an embodiment of the invention.

FIG. 6 illustrates the method used in one embodiment of the invention by the application server to construct the application container. An initial step 200, which can be performed at any time, is to allow the software developer to the edit the application configuration file, which will then determine the hierarchy of modules to be loaded. Then, in step 202, the application server initially receives a request for loading application components, usually from a client machine although applications may be executed on the same machine on which the application server itself resides. In step 204, the application server parses the configuration or control file (in one embodiment the application deployment descriptor file, for example in a WebLogic environment the weblogic-application.xml file) which contains the classloader hierarchy. The classes, modules, and other application components specified within the control file are recognized by the application server. In step 206, the application server proceeds to retrieve the specified application components from a computer readable medium (memory, disk, or other storage) in a manner consistent with the tag layout (i.e. the hierarchy) in the control file. In step 208, the application server then constructs the application container with the application components in the order in which they were retrieved, resulting in a hierarchical classloader structure in the newly constructed application.

Individual EJB Classloader for Implementation Classes

Embodiments of the invention may also be used to provide individual EJB classloaders for implementation classes. In accordance with one embodiment, the server (for example WebLogic Server) allows the developer or the system to reload individual EJB modules without forcing other modules to be reloaded at the same time and having to redeploy the entire EJB module. Since EJB classes are invoked through an interface, it is possible to load individual EJB implementation classes in their own classloader. In this manner, these classes can be reloaded individually without having to redeploy the entire EJB module.

Figure 7:
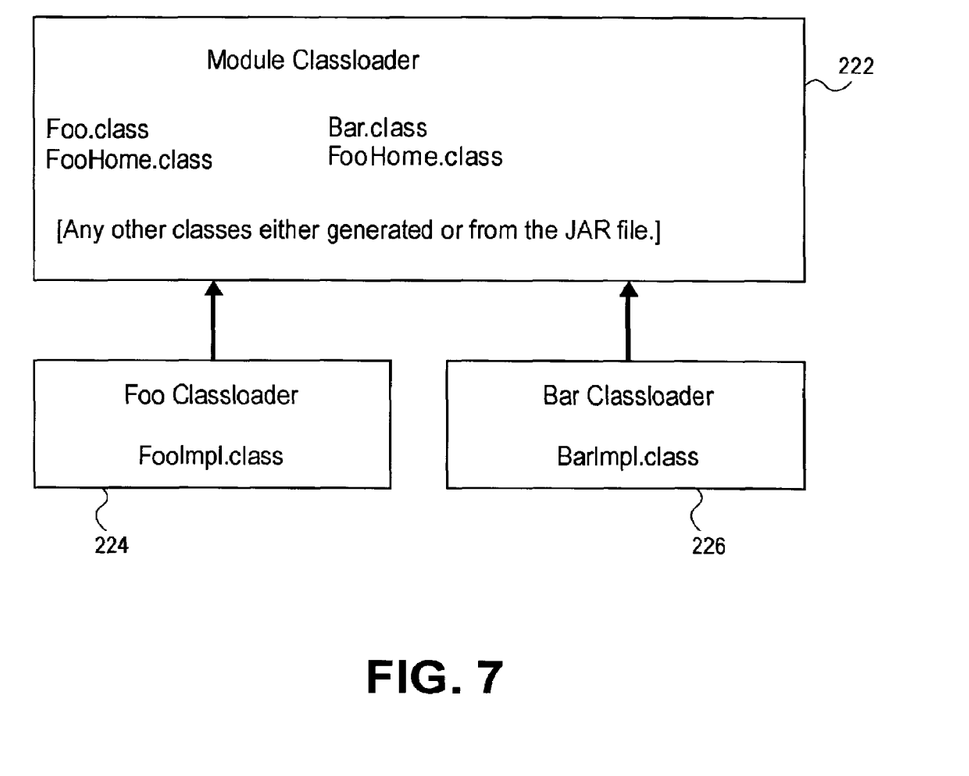
FIG. 7 illustrates a classloader hierarchy for a simple EJB module in accordance with an embodiment of the invention.

FIG. 7 shows a diagram of what the classloader hierarchy for a single EJB module looks like. In the example shown in FIG. 7, the module 222 contains two EJBs ("Foo" 224 and "Bar" 226 in this example). This represents a sub-tree of the general application hierarchy described in the previous section. To perform an incremental update (partial upgrade), the developer can use the following command line to redeploy myejb/foo.class:

```
java weblogic.Deployer -adminurl url -user user -password password
  -name myapp -redeploy myejb/foo.class
```

After the redeploy command, the developer can then provide a list of files relative to the root of the exploded application that they want to update. This might be the path to a specific element (as above), or a module, or any set of elements and modules. For example, the developer can use the following command to redeploy anotherejb:

```
java weblogic.Deployer -adminurl url -user user -password password
  -name myapp -redeploy mywar myejb/foo.class anotherejb
```

Given a set of files to be updated, the system tries to figure out the minimum set of things it needs to redeploy. Redeploying only an EJB impl class causes only that class to be redeployed. If the developer specifies the whole EJB (in the above example, anotherejb) or if they change and update the EJB home interface, the entire EJB module must be redeployed. Depending on the classloader hierarchy, this may lead to other modules being redeployed. Specifically, if other modules share the EJB classloader or are loaded into a classloader that is a child to the EJB's classloader, (as in our standard classloader module) then those modules are also reloaded.

Figure 8:
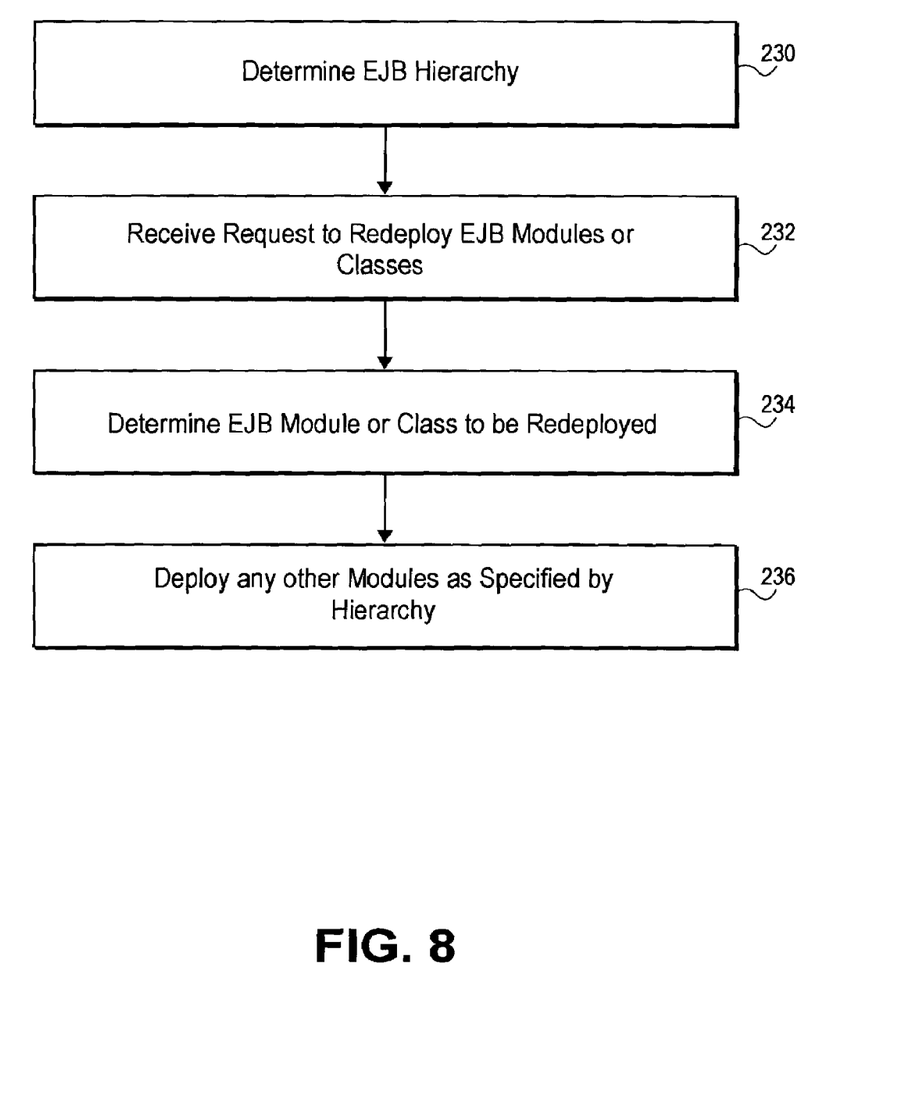
FIG. 8 is a flowchart showing the steps used to reload EJB implementations in a classloader hierarchy in accordance with an embodiment of the invention.

FIG. 8 illustrates the method used in accordance with an embodiment of the invention to allow reloading of EJB implementations. In step 230, the system allows the developer to specify EJB's and/or classes that comprise an EJB module hierarchy. This is performed by creating and storing the hierarchy of reloaders in an appropriate configuration file, as described above. In step 232, the system later receives a request or instruction to redeploy a particular class or module, for example an EJB. In step 234, the system parses the classloader hierarchy to determine which modules or classes should be redeployed to satisfy the request. In step 236, the necessary modules, including EJB's and/or classes are redeployed as specified by the classloader hierarchy.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the examples of how a classloader hierarchy may be used are given for purposed of illustration and the invention is not limited to such examples. It will also be evident that while the examples described herein illustrate how the invention may be used in a WebLogic environment, other application servers may use and benefit from the invention. It will also be evident that while the embodiments describe in detail the use of a classloader hierarchy with an EJB application, the methods described may be used with other application types and with other J2EE applications, including those that comprise EJBs, JSPs, and Web applications, etc. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for loading software applications, comprising:
a server, executing a Java virtual machine that includes a system classloader, for storing and running a plurality of software applications, wherein each of said plurality of software applications includes a plurality of deployable modules and classes associated therewith, and wherein the software applications or modules therein can be customized by a software developer and then deployed to run on the same server;
a control file, that can be edited by the software developer and associated with said plurality of software applications or modules, wherein said control file specifies a hierarchy of application classloaders as children of the system classloader, to be used with the modules in said plurality of software applications, and wherein the hierarchy includes a plurality of nested branches and siblings, including providing each of said plurality of software applications or modules with its own application classloader hierarchy so that the software applications or modules are not aware of classloaders or classes that are assigned to another software application, and wherein the hierarchy is specified by the software developer to provide namespace separation between two or more of the plurality of software applications or between different modules in any one of the software applications and wherein the system classloader includes only application level library classes, and wherein the nested branches of the hierarchy includes classes or modules that are frequently called by modules in said plurality of software applications as siblings within the same branch or same classloader; and a deployment utility that, upon receiving a request to deploy and run a software application on the server, parses the control file and determines which classloaders are specified therein for the software application being deployed, loads with said software application into the Java virtual machine at the server a selection of said application classloaders corresponding to the hierarchy specified by said control file, including creating sibling classloaders for implementations whose classes are to be loaded separately as specified by the control file, and, if a particular software application or a module in a software application is being redeployed then loading only the application classloaders that are specified in the branches for that particular software application or module, without loading any of the other branches in the hierarchy, and enables the server to host multiple isolated software applications or modules within the Java virtual machine, as defined by the hierarchy;

wherein, upon receiving a call to instantiate an implementation, the system searches within the hierarchy including first searching the calling classloader, and then successively searching parent classloaders above the calling classloader, to locate and instantiate necessary classes or objects.

2. The system of claim 1 wherein said control file can be modified by a software developer to specify a particular hierarchy of application classloaders to be used with a particular software application.

3. The system of claim 2 wherein said control file is a deployment descriptor.

4. The system of claim 3 wherein said control file is interpreted by an application container constructor during deployment so as to define the application container.

5. The system of claim 1 wherein said hierarchy is specified by a classloader structure declaration.

6. The system of claim 1 wherein a combination of said modules may be associated with a plurality of subordinate application classloaders.

7. The system of claim 1 wherein the server provides multiple software applications, each with their own hierarchy of application classloaders.

8. A method for loading software applications on a server executing a Java virtual machine that includes a system classloader, comprising the steps of:

providing a server executing a Java virtual machine for storing and running a plurality of software applications;

providing a plurality of software applications, wherein each of said plurality of software applications includes a plurality of deployable modules and classes associated therewith, and wherein the software applications or modules therein can be customized by a software developer and then deployed to run on the same server;

providing a control file associated with said software application or modules, wherein said control file can be edited by a software developer and specifies a hierarchy of application classloaders as children of the system classloader, to be used with the modules in said software application, and wherein the hierarchy includes a plurality of nested branches and siblings, including providing each of said plurality of software applications or modules with its own application classloader hierarchy so that the software applications or modules are not aware of classloaders or classes that are assigned to another software application, and wherein the hierarchy is specified by the software developer to provide namespace separation between two or more of the plurality of software applications or between different modules in any one of the software applications, and wherein said application classloaders are children of system classloader and wherein the system classloader includes only application level library classes, and wherein the nested branches of the hierarchy includes classes or modules that are frequently called by modules in said plurality of software applications as siblings within the same branch or same classloader; and upon receiving a request to deploy and run a software application on the server, parsing the control file and determining which classloaders are specified therein for the software application being deployed, retrieving a selection of said application classloaders according to the hierarchy specified by said control file, and loading said modules and classes into the Java virtual machine at the server as part of said software application corresponding to said hierarchy, including creating sibling classloaders for implementations whose classes are to be loaded separately as specified by the control file, and, if a particular software application or a module in a software application is being redeployed then loading only the application classloaders that are specified in the branches for that particular software application or module, without loading any of the other branches in the hierarchy, to enable the server to host multiple isolated software applications or modules within the Java virtual machine, as defined by the hierarchy;

wherein, upon receiving a call to instantiate an implementation, the system searches within the hierarchy including first searching the calling classloader, and then successively searching parent classloaders above the calling classloader, to locate and instantiate necessary classes or objects.

9. The method of claim 8 wherein said control file can be modified by a software developer to specify a particular hierarchy of application classloaders to be used with a particular software application.

10. The method of claim 9 wherein said control file is a deployment descriptor.

11. The method of claim 10 wherein said control file is interpreted by an application container constructor during deployment so as to define the application container.

12. The method of claim 8 wherein said hierarchy is specified by a classloader structure declaration.

13. The method of claim 8 wherein a combination of said modules may be associated with a plurality of subordinate application classloaders.

14. The method of claim 8 wherein the server provides multiple software applications, each with their own hierarchy of application classloaders.

15. The system of claim 1 wherein each of the plurality of modules is one of an EJB or Web application file, together with associated classes, configuration rules and resource files for that EJB or Web application file.

16. The system of claim 1 wherein the hierarchy that includes a plurality of branches specified by the software developer further comprises a plurality of nested references to modules and/or individual class files as specified by the software developer.

17. The method of claim 8 wherein each of the plurality of modules is one of an EJB or Web application file, together with associated classes, configuration rules and resource files for that EJB or Web application file.

18. The method of claim 8 wherein the hierarchy that includes a plurality of branches specified by the software developer further comprises a plurality of nested references to modules and/or individual class files as specified by the software developer.

19. The system of claim 1, wherein the control file includes a tag layout, and application class-loader declaration, including structure elements, that determine the hierarchy of modules and classes of the software application to be loaded into the application server; and
    wherein upon deployment, the deployment utility retrieves modules and classes from a computer readable medium in a manner consistent with the tag layout in the configuration file, and constructs an application container at the server with the classes and modules, in the order in which the classes and modules were retrieved, and according to the specified hierarchy, to create a hierarchical classloader.

20. The method of claim 8, wherein the control file includes a tag layout, and application class-loader declaration, including structure elements, that determine the hierarchy of modules and classes of the software application to be loaded into the application server; and
    wherein upon deployment, the deployment utility retrieves modules and classes from a computer readable medium in a manner consistent with the tag layout in the configuration file, and constructs an application container at the server with the classes and modules, in the order in which the classes and modules were retrieved, and according to the specified hierarchy, to create a hierarchical classloader.

21. A computer readable storage medium, including instructions stored thereon which when read and executed by a computer cause the computer to perform the steps comprising:
    providing a server executing a Java virtual machine for storing and running a plurality of software applications;
    providing a plurality of software applications, wherein each of said plurality of software applications includes a plurality of deployable modules and classes associated therewith, and wherein the software applications or modules therein can be customized by a software developer and then deployed to run on the same server;
    providing a control file associated with said software application or modules, wherein said control file can be edited by a software developer and specifies a hierarchy of application classloaders as children of the system classloader, to be used with the modules in said software application, and wherein the hierarchy includes a plurality of nested branches and siblings, including providing each of said plurality of software applications or modules with its own application classloader hierarchy so that the software applications or modules are not aware of classloaders or classes that are assigned to another software application, and wherein the hierarchy is specified by the software developer to provide namespace separation between two or more of the plurality of software applications or between different modules in any one of the software applications, and wherein said application classloaders are children of system classloader and wherein the system classloader includes only application level library classes, and wherein the nested branches of the hierarchy includes classes or modules that are frequently called by modules in said plurality of software applications as siblings within the same branch or same classloader; and
    upon receiving a request to deploy and run a software application on the server,
        parsing the control file and determining which classloaders are specified therein for the software application being deployed,
        retrieving a selection of said application classloaders according to the hierarchy specified by said control file, and
        loading said modules and classes into the Java virtual machine at the server as part of said software application corresponding to said hierarchy, including creating sibling classloaders for implementations whose classes are to be loaded separately as specified by the control file, and, if a particular software application or a module in a software application is being redeployed then loading only the application classloaders that are specified in the branches for that particular software application or module, without loading any of the other branches in the hierarchy, to enable the server to host multiple isolated software applications or modules within the Java virtual machine, as defined by the hierarchy;
    wherein, upon receiving a call to instantiate an implementation, the system searches within the hierarchy including first searching the calling classloader, and then successively searching parent classloaders above the calling classloader, to locate and instantiate necessary classes or objects.

22. The computer readable storage medium of claim 21, wherein the control file includes a tag layout, and application class-loader declaration, including structure elements, that determine the hierarchy of modules and classes of the software application to be loaded into the application server; and
    wherein upon deployment, the deployment utility retrieves modules and classes from a computer readable medium in a manner consistent with the tag layout in the configuration file, and constructs an application container at the server with the classes and modules, in the order in which the classes and modules were retrieved, and according to the specified hierarchy, to create a hierarchical classloader.

* * * * *

UNITED STATES PATENT AND TRADEMARK OFFICE
CERTIFICATE OF CORRECTION

| | | |
|---|---|---|
| PATENT NO. | : 7,665,080 B2 | Page 1 of 1 |
| APPLICATION NO. | : 10/777361 | |
| DATED | : February 16, 2010 | |
| INVENTOR(S) | : Mark Spotwood | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

In column 3, line 39, delete "example" and insert -- example, --, therefor.

In column 5, line 10, delete "app" and insert -- application). --, therefor.

In column 5, line 47, before "Resource" insert -- A --.

Signed and Sealed this

Nineteenth Day of October, 2010

David J. Kappos
*Director of the United States Patent and Trademark Office*